United States Patent
Teboul

(10) Patent No.: US 6,201,790 B1
(45) Date of Patent: Mar. 13, 2001

(54) NETWORK ACCESS CONTROL METHOD, AND DEVICE AND SYSTEM FOR IMPLEMENTING THIS METHOD

(75) Inventor: Guillène Teboul, Fontenay-sous-Bois (FR)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/029,208
(22) PCT Filed: Jun. 23, 1997
(86) PCT No.: PCT/IB97/00753
  § 371 Date: Feb. 25, 1998
  § 102(e) Date: Feb. 25, 1998
(87) PCT Pub. No.: WO97/50213
  PCT Pub. Date: Dec. 31, 1997

(30) Foreign Application Priority Data
  Jun. 26, 1996 (FR) .................... 96 07939
  Jan. 28, 1997 (FR) .................... 97 00897

(51) Int. Cl.$^7$ ............................... H04L 12/56
(52) U.S. Cl. .................. 370/232; 370/253; 370/395; 370/444; 370/449
(58) Field of Search ................ 370/229, 230, 370/231, 232, 235, 236, 252, 253, 389, 395, 412, 415, 416, 442, 443, 444, 449, 468, 477; 709/232, 233, 234, 235

(56) References Cited

U.S. PATENT DOCUMENTS

| | | | |
|---|---|---|---|
| 5,274,644 | * 12/1993 | Berger et al. | 370/95.1 |
| 5,313,454 | * 5/1994 | Bustini et al. | 370/13 |
| 5,625,622 | * 4/1997 | Johri | 370/232 |
| 5,790,521 | * 8/1998 | Lee et al. | 370/230 |
| 5,949,785 | * 9/1999 | Beasley | 370/398 |
| 6,011,775 | * 1/2000 | Bonomi et al. | 370/230 |

FOREIGN PATENT DOCUMENTS

2287854   9/1995  (GB).

* cited by examiner

Primary Examiner—Alpus H. Hsu
(74) Attorney, Agent, or Firm—Daniel J. Piotrowski

(57) ABSTRACT

The invention relates to a method of controlling access of messages contained, for example, in ATM cells, to a network (10). The cells transmitted by a source (11) are classified into n adjacent groups depending on the value of the instantaneous rate associated to each of the cells. For each cell ($C_i$) transmitted by the source (11) and which requests access to the network (10), a switch (122) only authorizes this access if in a global token reserve allocated per unit of time and distributed per group as a function of the number of cells each group contains, one token is still available for the group to which the cell ($C_i$) belongs or, if there is no such token, for a group of instantaneous rates which have higher values. This process thus establishes a priority for the slowest cells and does not allow cells occurring in bursts suddenly to disturb the network.

5 Claims, 3 Drawing Sheets

NETWORK ACCESS CONTROL METHOD, AND DEVICE AND SYSTEM FOR
IMPLEMENTING THIS METHOD

FIELD OF THE INVENTION

The present invention relates to a method of controlling access to an asynchronous transfer mode transmission network for messages contained in cells transmitted by data sources, said method comprising a first step of defining a transmission contract between each data source and said network and a second step of authorizing the access of the cells to the network.

For controlling the access to an asynchronous transfer mode transmission network for messages contained in cells transmitted by data sources, the invention also relates to a device for implementing said method and to a communication system comprising such a device.

BACKGROUND OF THE INVENTION

Traditional communication networks such as, for example, telephone or cable television are by nature intended each for a particular use and thus individually ill-adapted to executing the tasks which the other networks execute. Networks of a novel type have thus appeared and notably those operating in an Asynchronous Transfer Mode (ATM). According to this ATM, the transmission of a signal is effected in a digital data stream which is subdivided into fixed-size cells (53 octets). Each cell itself is formed by a header (5 octets) which contains the necessary information for the transfer of the cell, and a payload (48 octets), containing the useful information generated by a source. All the generated cells are then multiplexed via queues which are joined together to form an ATM network.

In the same ATM network, very different types of data may be present having specific constraints for each type. For example, the transmission of voice is to be effected in real time, but transmission errors are permitted within certain limits. Conversely, no real-time constraint affects a file transfer, but corrections of transmission errors are indispensable. When the transmitted data are video data according to the MPEG2 standard, a transmission in real time and having a smallest possible error rate is necessary.

For permitting data of such diverse nature to coexist in the network, a featuring of the traffic is basically ensured, by carrying out two operations called Connection Admission Control (CAC) and User Parameter Control (UPC). The operation of admission control, which the invention does not relate to, consists of verifying, when a user A wishes to communicate with a user B, whether the network has enough resources for effectively authorizing the connection of A and the corresponding data transfer to B, taking account of the connections already established across the network at that particular instant and of the necessity of not producing disturbances for these established connections.

For the network that establishes that a connection has been admitted between two users A and B, the operation of user parameter control (UPC) to which the present invention relates, consists of verifying that the sending user well respects the transmission contract which has been the object of the preceding admission control. Indeed, if this contract is violated either by accident (malfunctioning of the software) or voluntarily (fraudulent action), the additional resources which the network is to assign to these nonauthorized data transfers are taken from those that had already been assigned to the connections admitted by contract and respecting their transmission contract. Furthermore, an unforeseen data congestion may result from this violation of contract and corrupt wholly or in part the operation of the network. Indeed, the queues are always of limited length, and, finally, more and more data cells occur which are to be discarded.

A very frequently used method of implementing this user parameter control operation is described in patent application GB-2287854. Better known under its English name of leaky bucket algorithm, this method provides an authorization of access of a message, for example, an ATM cell, to a network only as a function of the residual level of a token reserve previously assigned as a function of a certain number of criteria notably linked with the featuring of the traffic. Initially, a time period T(UPC) is defined and a reserve of N tokens is formed for the duration of this period. A message, generated by a data source can then have access to a network only utilizing one of these tokens and it is thus a maximum of N messages that will be able to penetrate into the network during this period T(UPC). If the checking of the tokens, realized by a counter, shows that no token is available any longer for a new requested access, the message is rejected, or at any rate labeled to be transmitted only with a lower priority and on condition that it does not cause any problem for the operation of the network, even if the message is admitted.

This control method, however, has the following drawback. As only a maximum of N tokens can be disposed of at an arbitrary instant, no new token is created if no token has been used during the period T(UPC) that is completed (if certain tokens have been used, all the non-used tokens are lost). Therefore, in the situation where no token whatsoever has still been used and where suddenly a burst of N messages occurs, each of them uses a token and all messages access the network, but the token reserve is emptied and any new access is, however, forbidden for a rather long period of time (certain networks furthermore provide that the transmission contracts are not concluded when the messages thus occur as bursts, very irregularly running the risk of completely disturbing the network).

SUMMARY OF THE INVENTION

It is an object of the invention to propose an improved user parameter control method with which it is possible to adapt to whatever type of service or source of traffic.

For this purpose, the invention relates to a method as defined in the opening paragraph of the description and is furthermore characterized in that, for each source:

the first step comprises for the cells which occur in each time unit, a first operation of classification into n groups, depending on the larger or smaller value of the time interval between two successive cells, that is to say, depending on the instantaneous rate associated to each cell, and a second operation of distributing a global stock of tokens allocated to said time unit in proportion to the number of cells in each group;

the second step comprises for each cell which occurs at the input of the network a first operation of requesting authorization of access of this cell to the network, said access only occurring in the case of an available token for the group that corresponds to the instantaneous rate of this cell, followed, if access is refused, by one or various additional operations of requesting authorization to access the same cell by successively searching for an available token per group that has directly higher instantaneous rates, till an authorization of access for one of the groups encountered, or definitive refusal.

If only the method according to the state of the art is used, no distinction is made between the cells which have a high instantaneous rate and the cells which are slower. The cells arriving in bursts are indeed network disturbers because they will abruptly fill the input queues of the network access switches and thus very rapidly cause the following cells to be rejected. When adapting this method by introducing distinct priorities which depend on the type of cells which occur, these disturbances are avoided. The access control method thus proposed makes it possible to provide a much more flexible management than previously of the resources of the respective network.

In a particular embodiment of the invention, this method is further characterized in that, for implementing said second step, a cell rank verification operation occurs, either followed by an operation of acceptance of this cell by the network if this cell is the first cell to occur for the time interval concerned and the token reserve corresponding thereto, or, if this cell is not the first cell, by a first test operation testing whether a token is available in the group to which the respective cell belongs, taking account of the value of its instantaneous rate, while, if there is no such token available, this first test operation is followed by a second test step for testing whether or not there is a group that corresponds to higher instantaneous rate values and, if there is indeed such token, whether there is an available token in this group.

Another object of the invention is to propose a device for implementing said method.

For this purpose, the invention relates to a device as described in the opening paragraph of the description and which is furthermore characterized in that:

said transmission contract defining stage comprises a traffic featuring circuit of each of said data sources by determining the instantaneous rate of the cells transmitted by each source and classifying for each source each of the cells which occur per predetermined unit of time into n groups depending on the larger or smaller value of this instantaneous rate, and an allocation circuit for allocating a global stock of tokens allocated to said time unit by distributing said tokens in proportion to the number of cells in each group;

said access management sub-assembly comprises a storage memory for storing the numbers of tokens allocated to each group by said allocation circuit and a switch for authorizing the access to a network as a function of the number of tokens which, for a cell transmitted with a value of a given instantaneous rate, remain available for the group corresponding to said value or, if there is no such cell, for a corresponding group having higher instantaneous rate values.

Another object of the invention is also to propose a communication system between at least one data source and one communication network, including such a device.

For this purpose, the invention relates to a communication system comprising, in addition to the source and the network:

a transmission contract defining stage including a traffic featuring circuit for classifying data cells transmitted by each source into n groups depending on the larger or smaller instantaneous rate value associated to each cell that occurs at the input of the network, and an allocation circuit for allocating a global stock of tokens by distributing said tokens in proportion to the number of cells in each group;

an access management sub-assembly including a storage memory for storing numbers of tokens allocated to each group by said allocation circuit and a switch for authorizing the network access as a function of the number of tokens which, for a transmitted cell having a given instantaneous rate value, remain available for the group that corresponds to said value or, if there is no such cell, for a group corresponding to higher instantaneous rate values.

These and other aspects of the invention will be apparent from and elucidated with reference to the embodiments described hereinafter.

DETAILED DESCRIPTION OF THE PREFERRED EMBODIMENT

The access control method according to the invention and examples of its implementation are here described in the case of an ATM network for which each message or data block is a cell of a given length (a packet of 53 octets). Consequently, this particular implementation of the invention by means of cabled electronic modules does not exclude other possible embodiments which include, for example, a microprocessor which ensures the execution of a series of instructions corresponding to the functions of certain or all the circuits provided in the embodiment to be described hereafter.

Figure 1:
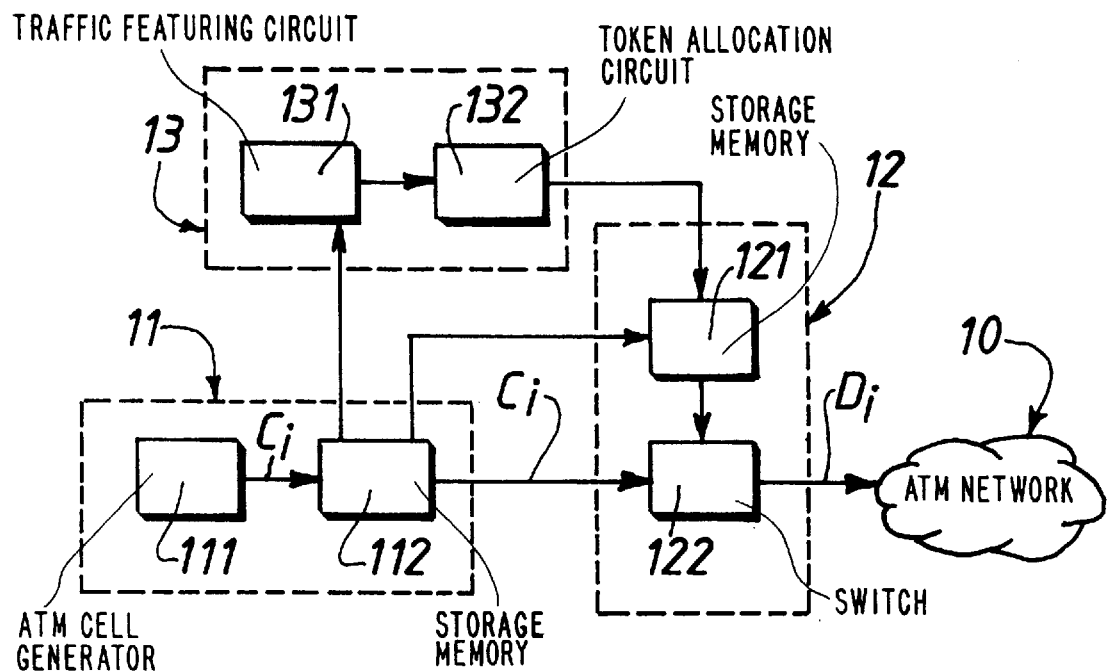
FIG. 1 is an example of a communication system implementing the access control method according to the invention.

FIG. 1 shows an example of a communication system comprising an ATM network 10, a data source 11 and a network access control device, including a defining stage for defining a transmission contract between the source and the network, which is here a token reservation stage 12, and an access management sub-assembly 13. The data source 11 comprises, for example, as indicated in FIG. 1, an ATM cell generator 111 and a storage memory 112 for storing cells produced by this generator (these cells are denoted $C_i$). Stage 12 comprises a storage memory 121 for storing token reserves and a switch 122. The access management sub-assembly 13 comprises a traffic featuring circuit 131 of the source and a token allocation circuit 132.

Figure 2:
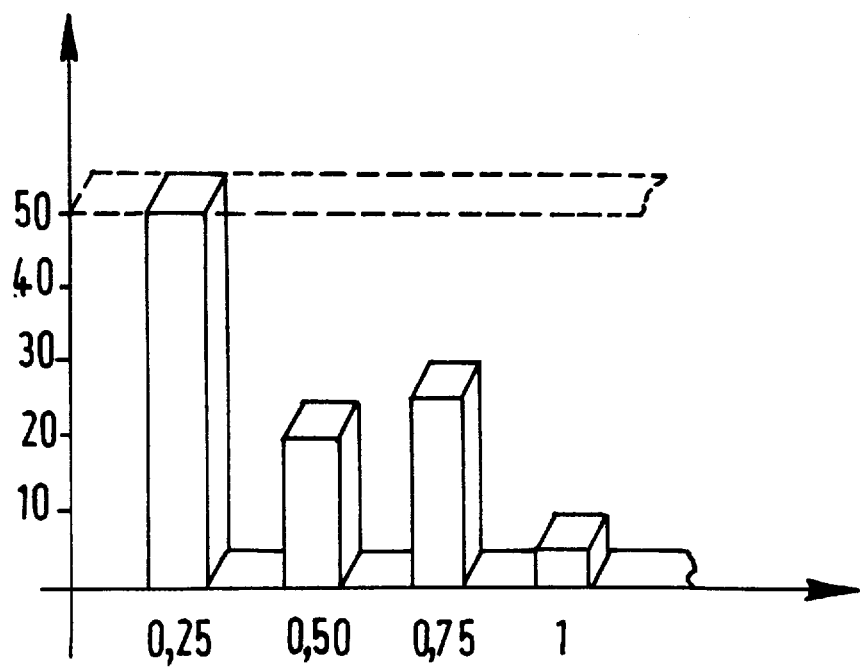
FIG. 2 is an example of a distribution curve of the instantaneous rate values of the cells transmitted by a data source; and the FIGS. 3 and 4 are flow charts illustrating two embodiments of the access control method according to the invention.

For the description of the invention, only the case of one source is considered here, but it will be obvious that the following process is the same for each of the sources which request access to the network. The profile of the source under consideration is given at the beginning in the circuit 131 by the concluded transmission contract to which corresponds, as indicated, for example, in FIG. 2, a curve showing the distribution into n groups of these instantaneous rate values, here with n=4 (the maximum value being normalized at 1, for example). In the case of this example, the first group contains all the instantaneous rate values which are comprised between, for example 0% and 25% of the maximum value, the second group those comprised between 25% and 50%, the third group those comprised between 50% and 75% and the fourth group those comprised between 75% and 100%. FIG. 2 shows an example of a distribution of the instantaneous rates for a classification into four groups of equal size (any classification considered is not more than a choice: the narrower the intervals are, the more the management of the traffic is refined in a precise manner), but the number of groups may certainly be different and the sizes of these groups may be different from each other.

In the case of the invention, instead of one given token reserve being allocated per time unit T(source), the tokens are allocated per group and with a number of tokens per group determined by the proportion of expected cells in each group (that is to say, by the proportions as represented in the distribution curve of FIG. 2). This allocation is realized by circuit 132 which sends the token allocation values per group to the memory 121.

Figure 3:
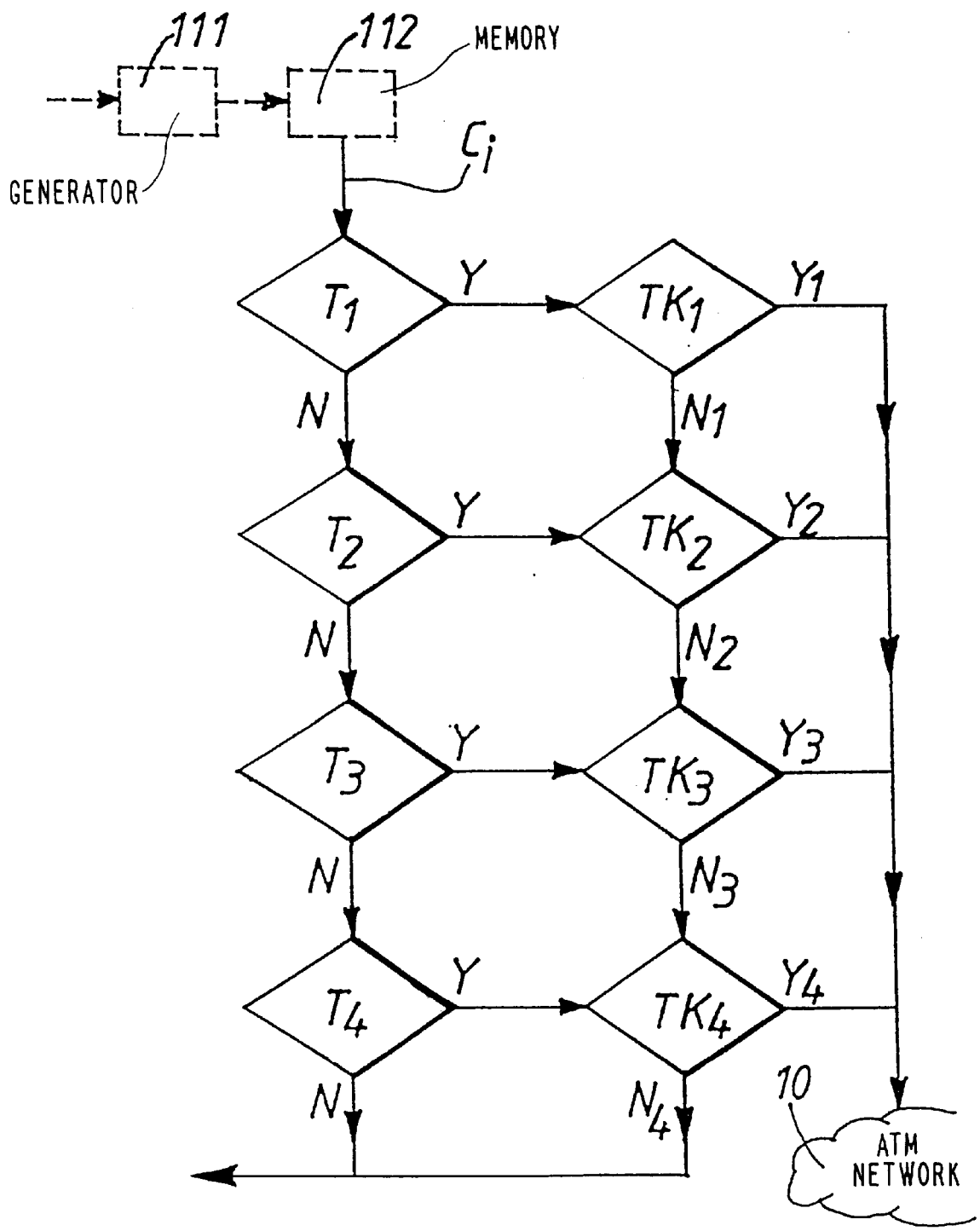

A first possible embodiment of the invention is explained hereafter with reference to the flow chart of FIG. 3. When a cell $C_i$ sent by the generator 111 and stored in the memory 112 occurs at the input of stage 12, the level of tokens in the group to which the cell belongs (group determined by the tests $T_1$, $T_2$, $T_3$, $T_4$, whose outputs Y and N respectively designate that it either or not belongs to the tested group) is controlled (control $TK_1$). If a token is still available (output $Y_1$ of the control $TK_1$), the switch 122 closes and the access of the cell to the network 10 is authorized. If, alternatively, a cell no longer finds tokens in the group to which it belongs, its access to the network is not authorized (output $N_1$ of the control $TK_1$), unless it finds an available token (control $TK_2$) in the adjacent group corresponding to instantaneous rates which have higher values. This token is then used, which correspondingly reduces the token reserve that was allocated to the faster cells. If, in contrast, it does not find tokens in this adjacent group (output $N_2$), its access to the network is again refused, unless, there again, it finds an available token (control $TK_3$, output $Y_3$), in the adjacent group of tokens that corresponds to rates which have even higher values, and so on (control $TK_4$, output $Y_4$ or $N_4$).

Figure 4:
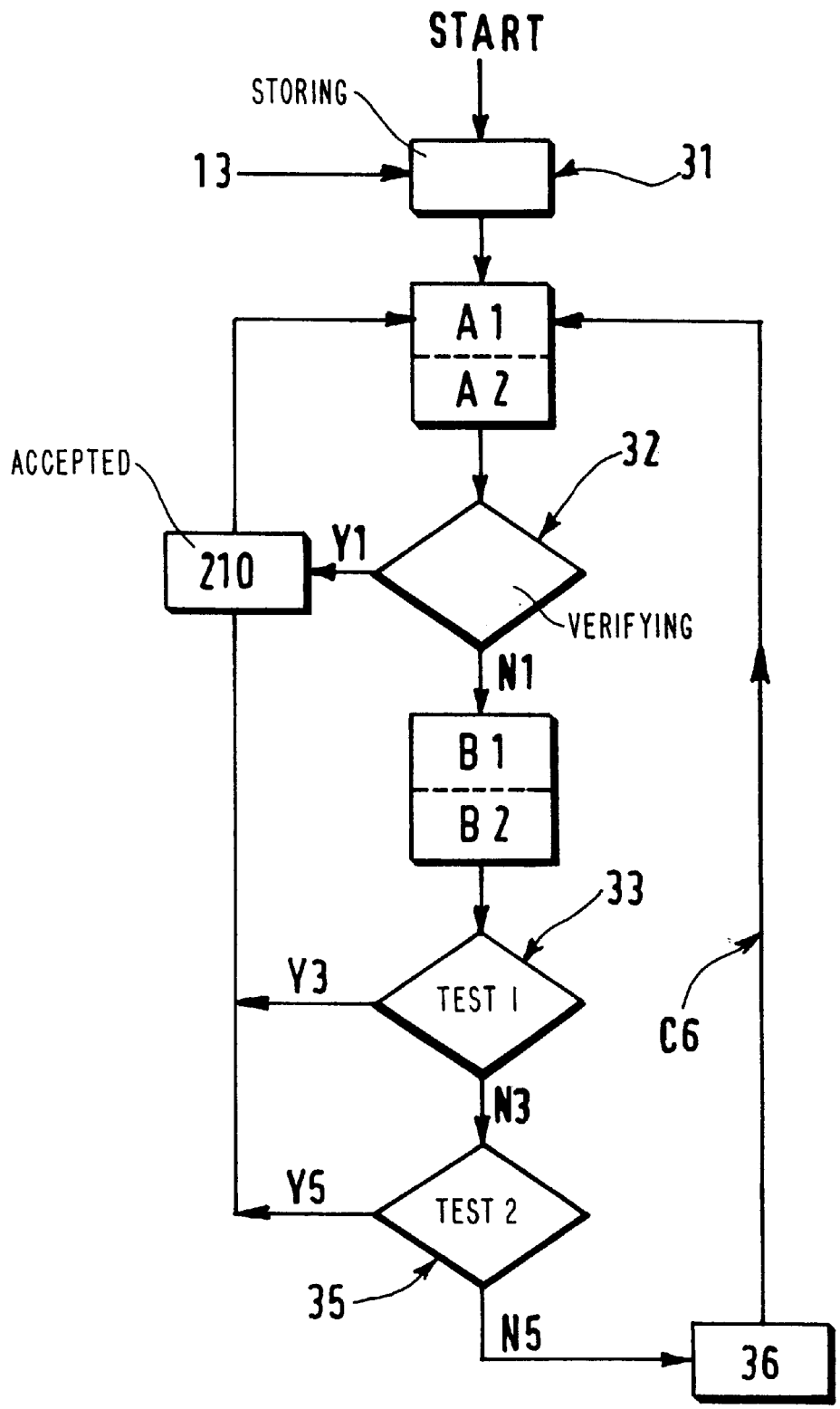

A second embodiment of the invention is proposed hereafter with reference to the flow chart of FIG. 4 which begins at the position "START". The first step shown (step 31) consists for each time interval of storing the allocation of tokens per group under the influence of circuit 132 and as a function of the featuring effected by circuit 131. The token reserve then being defined and the device then being ready (sub-step A1=one cell expected) for the arrival of a cell (sub-step A2), the second step (step 32) consists of verifying the rank of this cell.

If this cell is the first cell (output $Y_1$) to present itself for the time interval under consideration and the token reserve corresponding thereto, it is accepted (step 210) by the network 10 (the access to the network is made by closing the switch 122: connection $D_1$ in the embodiment of FIG. 1), and its instant of arrival is stored. If, on the other hand, it is not the first cell (output $N_1$), the time interval separating its instant of arrival $T_N$ from the instant of arrival of the preceding cell (denoted $T_B$ in a general manner) is stored (sub-step B1), and the corresponding instantaneous rate is calculated (this rate is equal to $1/(T_N-T_B)$). The value thus calculated allows to classify the respective cell into one of the n (here 4) groups defined above (sub-step B2).

A test 33 is then provided for verifying whether a token is still available (output $Y_3$) or not (output $N_3$) for the group to which the respective cell belongs, taking account of the value of its instantaneous rate $1/(T_N-T_B)$. If a token is available (output $Y_3$), this token is used, the token reserve for this group decreases by unity, and the cell is accepted by the network 10 (step 210). If, on the other hand, no token is available any longer (output $N_3$), a second test 35 is provided for verifying, on the one hand, whether there still exists a corresponding group that has higher instantaneous rate values and, on the other hand, if it exists, whether a token is still available (output $Y_5$) or not (output $N_5$) for this other group.

As observed previously, if a token is available (output $Y_5$), it is used, the token reserve for this group is reduced by unity, and the cell is accepted by the network (step 210, closing of switch 122). If no token whatsoever is available any longer for this group (output $N_5$), or, similarly, after another group corresponding to still higher instantaneous rate values has been searched for, for this other group a procedure (step 36) for the unaccepted cells, which may be, for example, a final access refusal or, possibly, the assignment of a lower priority is provided on the output of the connection $N_5$, while this cell is queued for a later transmission attempt (connection $C_6$) if the traffic conditions so permit.

After the acceptance (step 210) or refusal (step 36) of a cell by the network, a new cell arrives and the process is resumed in similar fashion. Step 32 is obviously only carried out for the first cell and the process proceeds directly in the other cases from the sub-step A2 to the sub-step B1 with a new calculation of the instantaneous rate $1/(T_N-T_B)$.

Finally, a cell is thus only admitted to the network if the cell finds a token still available in the group to which it belongs, or, if there is no such token, in a group that corresponds to instantaneous rates having a higher value. The reverse is not true: a slower cell may take the place of a faster cell, but not the other way round.

What is claimed is:

1. A method of controlling access to an asynchronous transfer mode transmission network for messages contained in cells transmitted by data sources comprising:
   a first step of defining a transmission contract between each data source and the network including, for the cells which occur in given time units:
   a first operation of classification into n groups, depending on an instantaneous rate associated to each cell, and
   a second operation of distributing a global stock of tokens allocated to said time unit in proportion to the number of cells in each group; and
   a second step of authorizing the access of the cells to the network, including, for each cell which occurs at the input of the network:
   a first operation of requesting authorization of access of a given cell to the network, said access only occurring in the case of an available token for the group that corresponds to the instantaneous rate of this cell, and
   at least one additional operation requesting authorization to access the same cell by successively searching for an available token per group that has directly higher instantaneous rates,
   wherein the at least one additional operation only occurs if access is refused previously, and wherein the at least one additional operation occurs until an authorization of access for one of the groups is encountered, or definitive refusal is encountered.

2. A method as claimed in claim 1, in which the second step further comprises:
   a cell rank verification operation,
   a first test operation testing whether an available token exists in the group to which the respective cell belongs, and
   a second test step testing whether there is a group that corresponds to higher instantaneous rate values, and if an available token exists within that group, wherein an operation of acceptance of the given cell by the network occurs if the given cell is the first cell to occur for the time interval concerned and the token reserve corresponding thereto, and wherein the first test operation is followed by the second test if no available token exists within the group.

3. A method as claimed in claim 1 in which classification is made into four groups of equal size.

4. A device for controlling access to an asynchronous transfer mode transmission network for transmitting messages contained in cells transmitted by data sources, comprising:

a transmission contract defining stage between each data source and said network including:

a traffic featuring circuit in each of said data sources by determining an instantaneous rate of the cells transmitted by each source and classifying for each source each of the cells which occur per predetermined unit of time into n groups depending on the larger or smaller value of this instantaneous rate, and an allocation circuit for allocating a global stock of tokens allocated to said time unit by distributing said tokens in proportion to the number of cells in each group; and a cell access management sub-assembly occurring at the input of the network and including:

a storage memory for storing the numbers of tokens allocated to each group by said allocation circuit, and a switch for authorizing the access to the network as a function of the number of tokens which remain available for the group corresponding to said value for a cell transmitted with a value of a given instantaneous rate, and for a corresponding group having higher instantaneous rate values, if there is no such cell.

5. A communication system between at least one data source and one communication network comprising:

a transmission contract defining stage including a traffic featuring circuit for classifying data cells transmitted by the at least one data source into n groups depending on the larger or smaller instantaneous rate value associated to each cell that occurs at the input of the network, and an allocation circuit for allocating a global stock of tokens by distributing said tokens in proportion to the number of cells in each group;

an access management sub-assembly including a storage memory for storing numbers of tokens allocated to each group by said allocation circuit and a switch for authorizing the network access as a function of the number of tokens which, for a transmitted cell having a given instantaneous rate value, remain available for the group that corresponds to said value or, if there is no such cell, for a group corresponding to higher instantaneous rate values.

* * * * *